(12) United States Patent
Kakai

(10) Patent No.: US 8,475,089 B2
(45) Date of Patent: Jul. 2, 2013

(54) INDEXABLE MILLING INSERT FOR MILLING TOOLS

(75) Inventor: Isak Kakai, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 265 days.

(21) Appl. No.: 13/099,527

(22) Filed: May 3, 2011

(65) Prior Publication Data
US 2011/0274506 A1    Nov. 10, 2011

(30) Foreign Application Priority Data
May 10, 2010    (SE) ...................................... 1050459

(51) Int. Cl.
*B23C 5/20*    (2006.01)
*B23B 27/16*    (2006.01)

(52) U.S. Cl.
USPC .......................................... 407/113; 407/103

(58) Field of Classification Search
USPC ........................ 407/42, 47, 48, 61, 103, 113
IPC .................................. B23B 27/16; B23C 5/20
See application file for complete search history.

(56) References Cited

U.S. PATENT DOCUMENTS

| | | | | |
|---|---|---|---|---|
| 3,484,919 A | * | 12/1969 | Stier | 407/77 |
| 3,653,107 A | * | 4/1972 | Hertel | 407/86 |
| 4,294,566 A | * | 10/1981 | Boone | 407/114 |
| 4,597,695 A | * | 7/1986 | Johnson | 407/113 |
| 4,648,760 A | * | 3/1987 | Karlsson et al. | 408/223 |
| 5,007,775 A | * | 4/1991 | Pantzar | 407/113 |
| 5,333,972 A | * | 8/1994 | Bernadic et al. | 407/113 |
| 5,365,805 A | * | 11/1994 | Pantzar et al. | 76/101.1 |
| 5,382,118 A | * | 1/1995 | Satran et al. | 407/42 |
| 5,443,334 A | * | 8/1995 | Pantzar | 407/113 |
| 5,597,271 A | * | 1/1997 | Men et al. | 407/113 |
| 5,685,670 A | * | 11/1997 | Satran | 407/42 |

(Continued)

FOREIGN PATENT DOCUMENTS

JP    2008080469 A    4/2008

*Primary Examiner* — Andrea Wellington
*Assistant Examiner* — Sara Addisu
(74) *Attorney, Agent, or Firm* — Morgan, Lewis & Bockius LLP

(57) ABSTRACT

An indexable milling insert for milling tools, including a bottom surface, an opposite chip surface, and a plurality of side surfaces extending between the bottom surface and the opposite chip surface, two of the side surfaces being primary clearance surfaces and two of the side surfaces being secondary clearance surfaces. A plurality of cutting edges are formed between the opposite chip surface and the primary and secondary clearance surfaces. Two of the cutting edges that connect to the primary clearance surfaces are primarily parallel and constitute main cutting edges. At least one lock structure is provided and includes a locking surface arranged on one of the secondary clearance surfaces so that the locking surface and the primary clearance surface form an acute angle, $\alpha$, in a section that is parallel to the bottom surface and intersects the locking surface. A coupling structure is arranged on the opposite chip surface and at least partly projects from a plane that is parallel to the bottom surface and passes through points of the main cutting edges situated closest to the bottom surface. The coupling structure comprises at least one flank surface, which is arranged in such a way that the flank surface, in a section that is parallel to the primary clearance surface and intersects the flank surface, forms an acute angle, $\beta$, with the bottom surface so that the flank surface slopes in the direction from the secondary clearance surface on which the locking surface is arranged.

29 Claims, 7 Drawing Sheets

U.S. PATENT DOCUMENTS

| | | | |
|---|---|---|---|
| 5,947,650 A * | 9/1999 | Satran et al. | 407/113 |
| 6,053,672 A * | 4/2000 | Satran et al. | 407/40 |
| 6,099,209 A * | 8/2000 | Murray et al. | 407/1 |
| 6,503,028 B1 * | 1/2003 | Wallstrom | 407/35 |
| 6,607,334 B2 * | 8/2003 | Satran et al. | 407/35 |
| 6,872,034 B2 | 3/2005 | Satran et al. | |
| 6,929,427 B2 * | 8/2005 | Satran | 407/42 |
| 7,037,051 B2 * | 5/2006 | Wermeister | 407/113 |
| 7,063,489 B2 * | 6/2006 | Satran | 407/113 |
| 7,073,987 B2 * | 7/2006 | Hecht | 407/113 |
| 7,241,082 B2 | 7/2007 | Smilovici et al. | |
| 7,390,149 B2 * | 6/2008 | Wihlborg | 407/35 |
| 7,530,769 B2 * | 5/2009 | Kress et al. | 408/1 R |
| 7,722,297 B2 * | 5/2010 | Dufour et al. | 407/66 |
| 8,277,151 B2 * | 10/2012 | Wandeback | 407/42 |
| 8,277,153 B2 * | 10/2012 | Kovac et al. | 407/113 |
| 2003/0099519 A1 | 5/2003 | Robinson et al. | |
| 2007/0256287 A1 | 11/2007 | Kocherovsky et al. | |

* cited by examiner

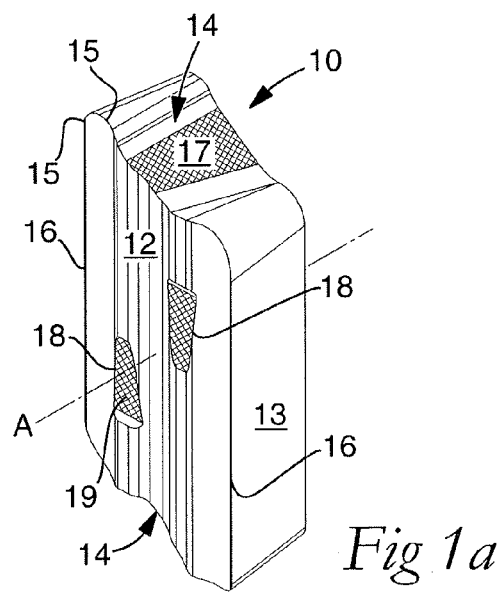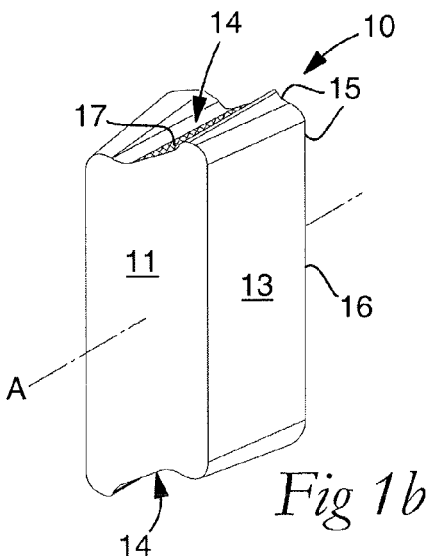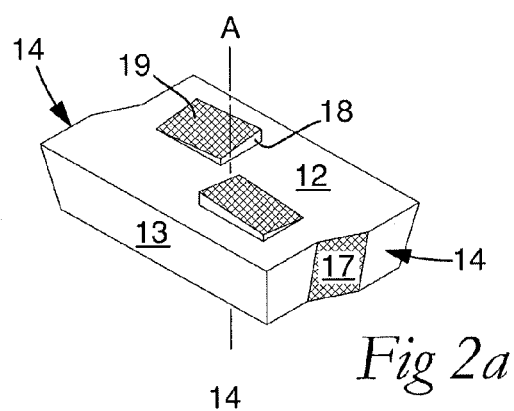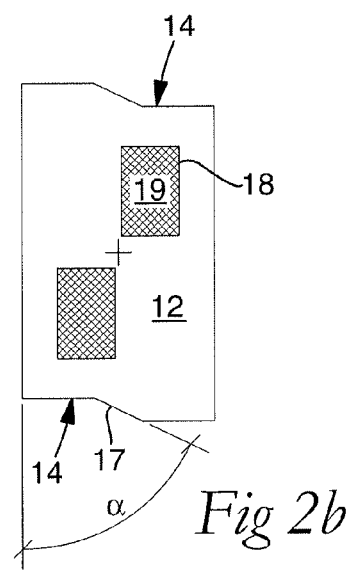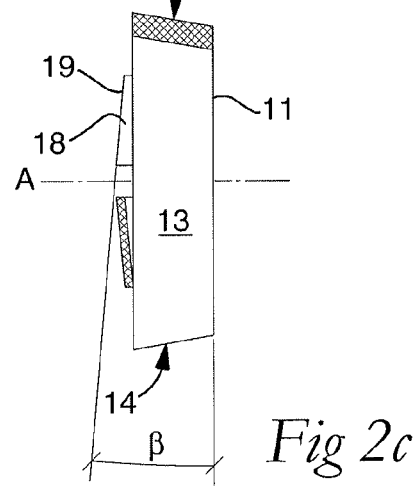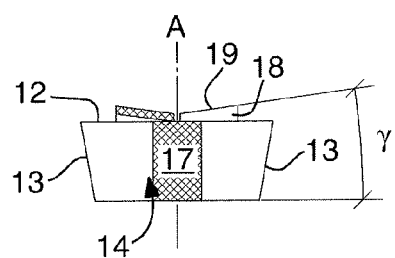

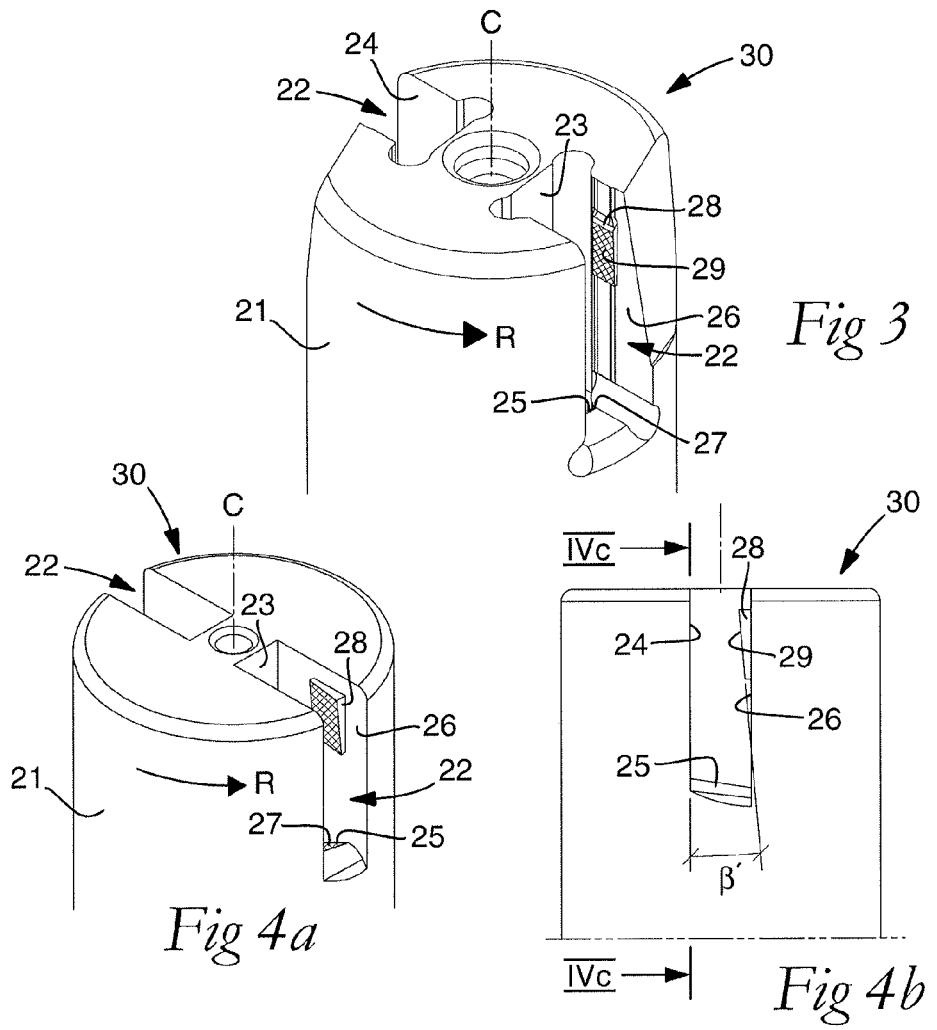
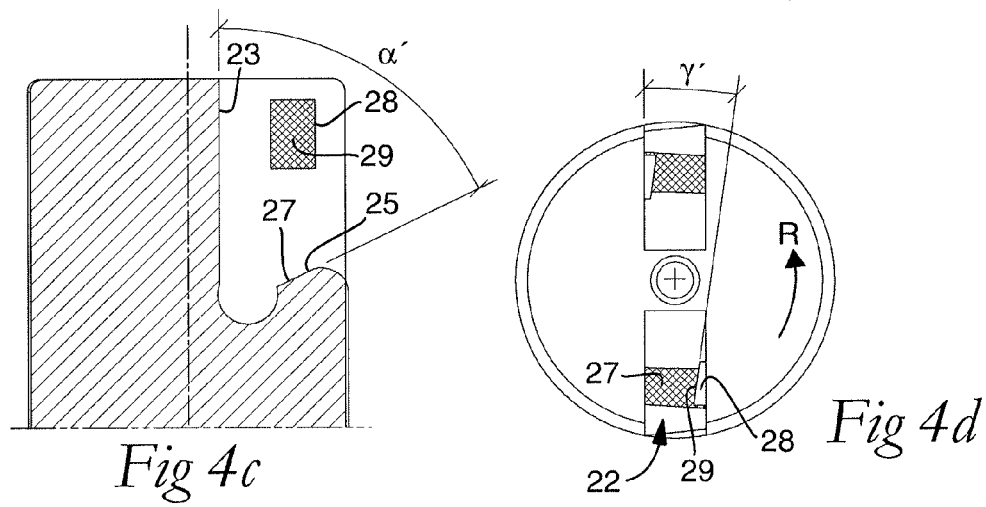

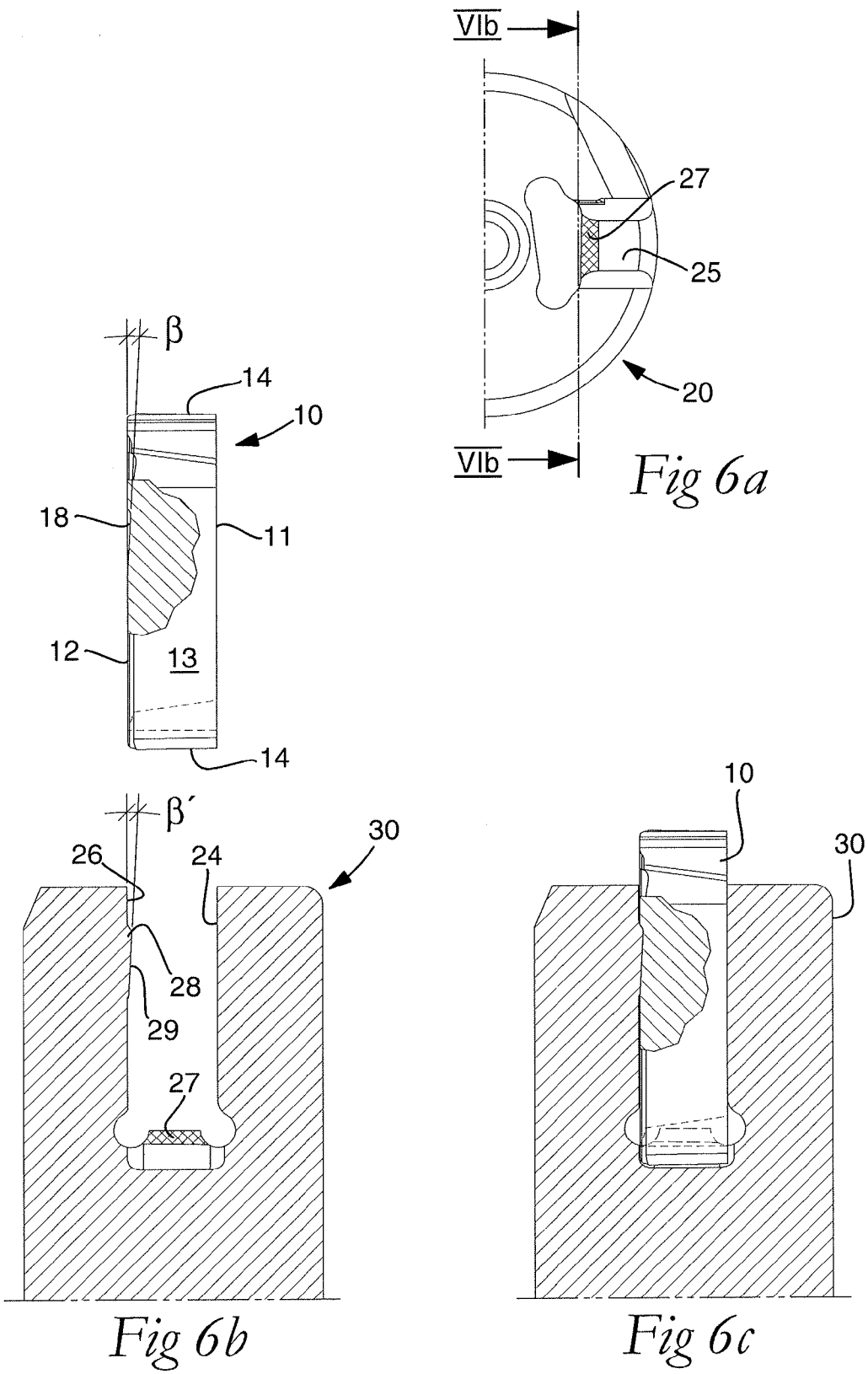

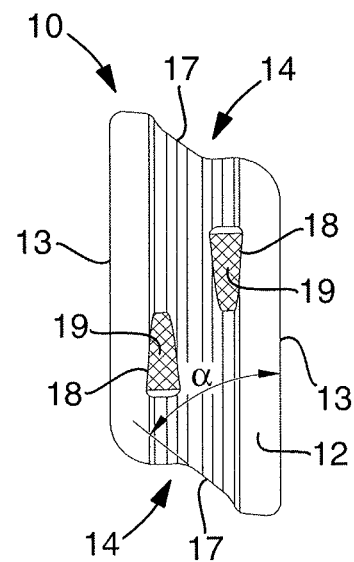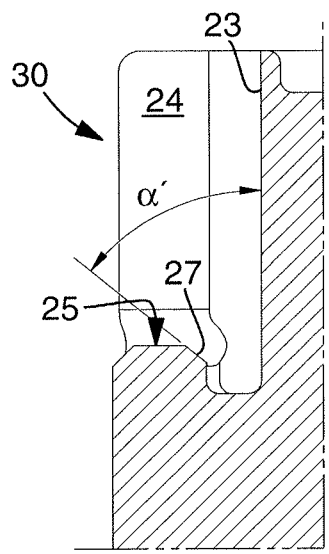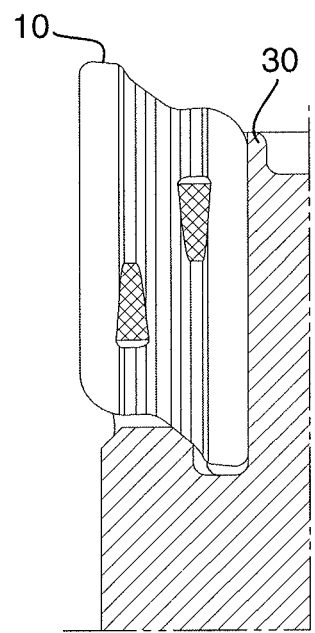
Fig 7a　　　　　　　　　　Fig 7b

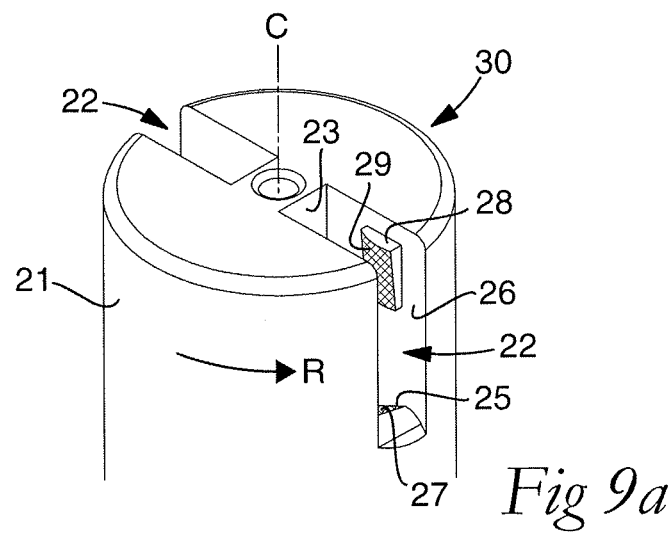
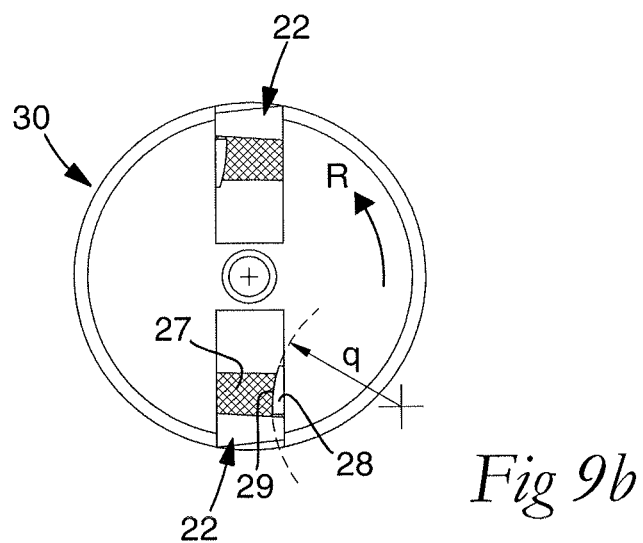

INDEXABLE MILLING INSERT FOR MILLING TOOLS

This application claims priority under 35 U.S.C. §119 to Swedish Patent Application No. 1050459-5 filed on May 10, 2010, which is incorporated by reference herein in its entirety.

FIELD OF THE INVENTION

The present invention relates generally to an indexable milling insert and a corresponding basic body, intended for use in milling tools of small diameters, foremost in rotary shank-end mills for the machining of metallic workpieces. The invention also relates generally to a milling tool having indexable milling inserts detachably mounted in a basic body.

BACKGROUND OF THE INVENTION

Face milling is an efficient method for machining surfaces. One of the milling tools that can be used for face milling is the shank-end mill, which advantageously may be used for operations such as machining of shoulders, grooves and edges, and is constructed to give axial reach. By a greater axial reach, i.e., milling depth, more material can be removed in the same operation, which is economically advantageous. In the machining of small details, milling cutters of small diameters are needed. By small diameters, in this the text, a diameter of 25 mm and smaller is intended, foremost a diameter of 8-12 mm. Today, operators who need a milling cutter in the diameter range of 25 mm and smaller are reduced to using to either conventional solid shank-end mills provided with long helical cutting edges, or milling cutters having one or more detachably mounted milling inserts.

Solid milling cutters are often manufactured from high speed steel, cemented-carbide coated high speed steel, or from solid cemented carbide. A disadvantage of solid shank-end mills is that they have to be reground when they have become worn and thereby no longer can machine the material efficiently and precisely. The regrinding is often expensive since cemented carbide requires advanced grinding tools. Another disadvantage of regrinding of the tools is that a milling cutter, which from the beginning has had a certain diameter, intended for a specific operation, for instance a certain groove width, gets a reduced diameter after grinding. A more economic and practical solution is to use a milling tool having detachable milling inserts in which one or more milling inserts of cemented carbide machine the workpiece and then are replaced when they become worn. The milling inserts may be indexable, i.e., they may have a plurality of cutting edges, which further contributes to the economical advantage.

A shank-end mill provided with milling inserts has a higher machining capacity but is limited in the axial cutting depth by the length of the insert edge. Long insert edges entail that the milling insert becomes more sensitive to cutting forces, thereby running the risk of being dislodged from its position. During a milling operation, the milling insert will be subjected to great radial forces but moderate axial forces. These forces will act to displace and turn the milling insert, and it is therefore important to have a rigid clamping to avoid vibrations and that the milling insert tends to tip. By "tip", it is here intended that the milling insert, because of forces acting on the cutting edge, turns out of its position. The number of milling inserts and the pitch vary depending on the diameter of the tool and which milling operation that is to be executed. A shank-end mill having indexable milling inserts may also be used for ramping operations, which is a combination of radial and axial feeding direction. A condition for ramping operations to be executable is, however, that the radial cutting depth of a pass does not exceed the insert width.

An indexable milling insert is usually clamped in a basic body by a center screw or the like fastening member. With decreased diameter of the tool, the milling inserts, and the screws by means of which the milling inserts are mounted, will consequently decrease in size. Small screws or other fastening members are difficult to handle since they easily are dropped in the mounting of the milling inserts. Small screws have also lower mechanical strength and are more difficult to screw in, since the threads and the screw head are more fragile and sensitive to the position of the screw in the threads. If the screw enters obliquely into the screw hole, the risk is great that the threads are destroyed, which has the consequence that the screw is destroyed. Also the threaded hole in the basic body may be damaged, which involves a great additional cost since the entire basic body may be needed to be replaced. For axially mounted milling inserts, it may also be hard to get access for tools when the milling inserts are to be mounted. Because of the diameter of the basic body, when small milling tools are concerned, also the number of milling inserts possible to mount becomes limited. Usually, the pitch is formed in such a way that one or two milling inserts are used simultaneously.

Tangentially mounted indexable milling inserts for milling cutters are disclosed in, for instance, U.S. Pat. No. 6,872,034 and U.S. Pat. No. 7,241,082, wherein the indexable milling insert is mounted by a through screw. By the fact that the milling inserts are mounted tangentially in the basic body, the problem to access the screw by the tool becomes smaller. However, the problem of milling cutters of small diameters (<25 mm diameter) remains, foremost the fact that the loose details become difficult to handle, as well as that small fastening members are sensitive in the mounting step and have lower mechanical strength.

The present invention aims at obviating the above-mentioned disadvantages of previously known indexable milling inserts and at providing an improved indexable milling insert. Therefore, a primary object of the invention is to provide indexable inserts, and milling tools having indexable milling inserts, that are suitable for small diameters (<25 mm).

SUMMARY OF THE INVENTION

In an embodiment, the invention provides an indexable milling insert for milling tools, including a bottom surface, an opposite chip surface, and a plurality of side surfaces extending between the bottom surface and the opposite chip surface, two of the side surfaces being primary clearance surfaces and two of the side surfaces being secondary clearance surfaces. A plurality of cutting edges are formed between the opposite chip surface and the primary and secondary clearance surfaces. Two of the cutting edges that connect to the primary clearance surfaces are primarily parallel and constitute main cutting edges. At least one lock structure is provided and includes a locking surface arranged on one of the secondary clearance surfaces so that the locking surface and the primary clearance surface form an acute angle, $\alpha$, in a section that is parallel to the bottom surface and intersects the locking surface. A coupling structure is arranged on the chip surface and at least partly projects from a plane that is parallel to the bottom surface and passes through points of the main cutting edges situated closest to the bottom surface. The coupling structure includes at least one flank surface, which is arranged in such a way that the flank surface, in a section that is parallel to the primary clearance surface and intersects the flank surface, forms an acute angle, β, with the bottom surface so that the flank surface slopes in the direction from the secondary clearance surface on which the locking surface is arranged.

In another embodiment, the invention provides a basic body for milling tools, including an envelope surface having a cylindrical basic shape and being rotatable around a center axis, C. Provided in the basic body are at least one support surface directed radially outward in the direction from the center axis, C, at least one bottom support surface directed in the intended direction of rotation, R, a top support surface opposite the bottom support surface, and at least one side support surface connecting to the bottom support surface and the support surface. The support surface, the bottom support surface, and the side support surface define a plurality of separated recesses provided around a periphery of the envelope surface. At least one lock structure is provided in each recess, the lock structure including a locking surface and a coupling structure. The locking surface is arranged on the side support surface, so that the locking surface and the support surface, in a section that is parallel to the bottom support surface and intersects the locking surface, form an acute angle, α'. The coupling structure is arranged on, and projects from, the top support surface and includes at least one flank surface. The flank surface is arranged in such a way that the flank surface, in a section that is parallel to the support surface and intersects the flank surface, forms an acute angle, β', with the bottom surface so that the flank surface slopes toward the side support surface.

In another embodiment, the invention provides a milling tool, including a basic body having a cylindrical basic shape and being rotatable around a center axis, C. The basic body includes at least one support surface directed radially outward in a direction from the center axis C, at least one bottom support surface directed in an intended direction of rotation R, a top support surface opposite the bottom support surface, and at least one side support surface connecting to the bottom support surface and the support surface. The support surface, the bottom support surface, and the side support surface define a number of separated recesses around a periphery of the basic body. At least one indexable milling insert is provided and includes a bottom surface, an opposite chip surface, and a plurality of side surfaces extending between the bottom surface and the opposite chip surface. Two of the side surfaces are primary clearance surfaces, and two of the side surfaces are secondary clearance surfaces. A plurality of cutting edges are formed between the chip surface and the clearance surfaces, where two cutting edges that connect to the primary clearance surfaces are primarily parallel and constitute main cutting edges. The basic body also includes a lock structure and the milling insert includes at least one corresponding lock structure. The lock structure includes corresponding locking surfaces, each one of which forms an acute angle, α, α', with the support surface of the basic body in a section that is parallel to the bottom support surface of the basic body and intersects the respective locking surface. The lock structure also includes corresponding coupling structures that are arranged on the top support surface of the basic body and the chip surface of the milling insert, respectively. Each of the coupling structures includes at least one flank surface, which is arranged in such a way that the flank surface, in a section that is parallel to the support surface and intersects the flank surface, forms an acute angle, β, β', with the bottom surface, so that the flank surfaces slope toward the side support surface of the basic body. The corresponding lock structures simultaneously press the milling insert toward the side support surface of the basic body, and toward the support surface of the basic body, so that the milling insert is kept in place in the basic body.

The milling insert, according to an embodiment of the invention, is mounted in the basic body without fastening members, which considerably facilitates the mounting of the milling inserts for the operator who should handle the milling tool. According to the embodiment, an interface is created between milling inserts and basic body that guarantees that the milling insert is kept in place in the correct position during the milling operation, without a fastening member needing to be used. The milling insert is fitted tangentially obliquely down into the body from the side by a key and is locked in all directions using a lock structure of the milling insert and the basic body, respectively. The lock structure includes locking surfaces and coupling structures, and the interface created by the lock structure provides the milling insert a satisfactory stability. In the mounted state, the locking surface of the basic body and of the milling insert will abut against each other. Also at least the flank surfaces of the coupling structure of the basic body and of the milling insert will abut against each other. Thus, in the mounted state, the lock structure of the basic body and of the milling insert, i.e., the locking surfaces and at least the flank surfaces of the coupling structure, respectively, will abut against each other.

The embodiment enables the manufacture of milling tools of small diameters having a greater number of indexable milling inserts on the basic body than what previously has been possible. An advantage of using a plurality of milling inserts on one and the same basic body is that it then goes faster to remove material, which is desirable from an economic point of view. Because the milling inserts are mounted without fastening members, the basic body does not have to be equipped with the corresponding recesses to receive the fastening member. Since no recesses, in addition to the recesses where the milling inserts are to be mounted, need to be made in the basic body, more room is made available for more insert seats. The lack of holes in the basic body, to receive fastening members, also means that the basic body becomes mechanically more stable, which is a great advantage for milling cutters of a small diameter.

An additional advantage of the present embodiment is that the milling insert is manufactured without through holes. In the manufacture of milling inserts having through holes, it is common that problems arise in the sintering. This is because of the material being compacted unevenly at the hole, which results in the milling insert having to be after-treated by grinding. Milling inserts without through recesses for the fastening members, for example screws, entail great advantages from a manufacturing point of view. In addition, the milling insert becomes mechanically stronger if it is made of solid material, i.e., lacks through holes.

By the coupling structure being formed according to the preferred embodiment, the milling insert and the basic body will be less sensitive to tolerances in the manufacture, thereby avoiding price rising grinding operations. Possible small deviations from the ideal geometrical design will not give any reduction of the securing effect, since such a deviation will be absorbed by the design of the coupling structure, specifically of the flank surfaces.

In case of a great axial reach, it is important with rigid clamping of the milling insert, since it becomes more sensitive to cutting forces than in case of a normal axial reach. Yet an advantage of the invention is that it allows a great axial milling depth, since the combined effect of the support surfaces and the coupling structure entails that the milling insert is stably fixed, which counteracts that the milling insert tips during the milling operation.

An additional advantage of the present embodiment is that it may provide good means of carrying out ramping operations. Ramping operations are possible if the radial cutting depth does not exceed the insert width. Axial feed and the ramping capacity are limited by the distance between cutting edge and milling cutter body, as well as by the length of the axial cutting edge. Depending on how the cutting edge is formed, the described invention may result in the possibility of carrying out ramping operations.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIGS. 1a,b show a perspective view of the milling insert according to an embodiment of the invention as seen toward the chip surface (a) and the bottom surface (b), respectively;

FIG. 2a shows a schematic planar view of the milling insert according to the embodiment in FIGS. 1a,b;

FIG. 2b shows a planar view of the milling insert in FIG. 2a;

FIG. 2c shows a side view of the milling insert in FIG. 2a;

FIG. 2d shows a side view of the milling insert in FIG. 2a;

FIG. 3 shows a perspective view of the basic body according to an embodiment of the invention;

FIG. 4a shows a schematic perspective view of the basic body according to the embodiment in FIG. 3;

FIG. 4b shows a side view of the basic body in FIG. 4a, in the radial direction toward the center axis;

FIG. 4c shows a section view along the line IVc in FIG. 4b;

FIG. 4d shows a planar view of an upper side of the basic body in FIG. 4a.

FIG. 6a shows a planar view of the basic body according to the embodiment in FIGS. 5a,b, as seen in the axial direction;

FIG. 6b shows an exploded section view along the line VIb in FIG. 6a;

FIG. 6c shows a side view of the tool according to the embodiment in FIGS. 5a,b along the line VIb in FIG. 6a;

FIGS. 7a,b show an exploded side view (a) and a side view (b), respectively, of the tool according to the embodiment in FIGS. 5a,b, as seen in the tangential direction opposite the direction of rotation;

FIG. 8b shows an exploded section view along the line VIIIb in FIG. 8a;

FIGS. 9a,b show a schematic perspective view (a), and planar view (b), respectively, of an embodiment of the basic body wherein the coupling structure has a cambered surface.

DETAILED DESCRIPTION OF THE PREFERRED EMBODIMENTS

Figure 5A:
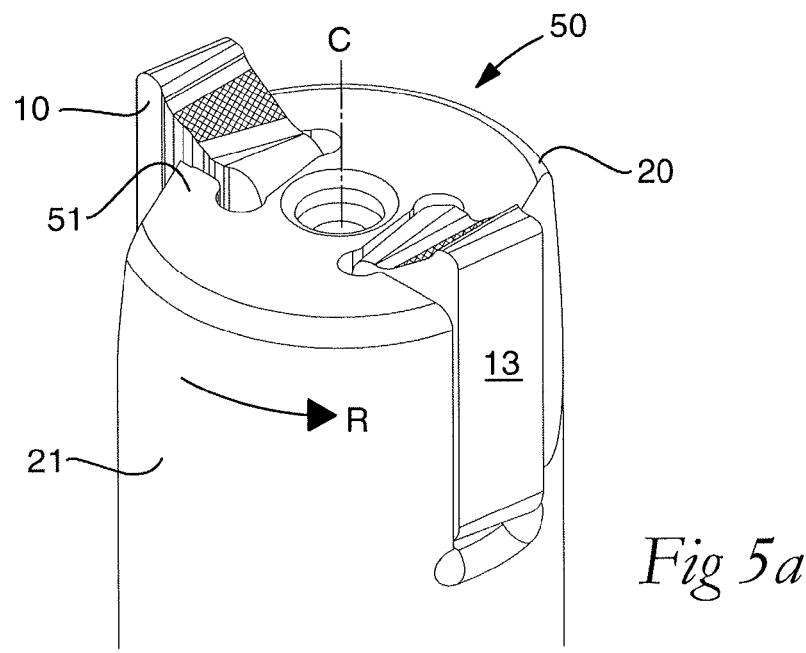
FIGS. 5a,b show a perspective view (a) and perspective exploded view (b), respectively, of a milling tool according to an embodiment of the invention.
Figure 5B:
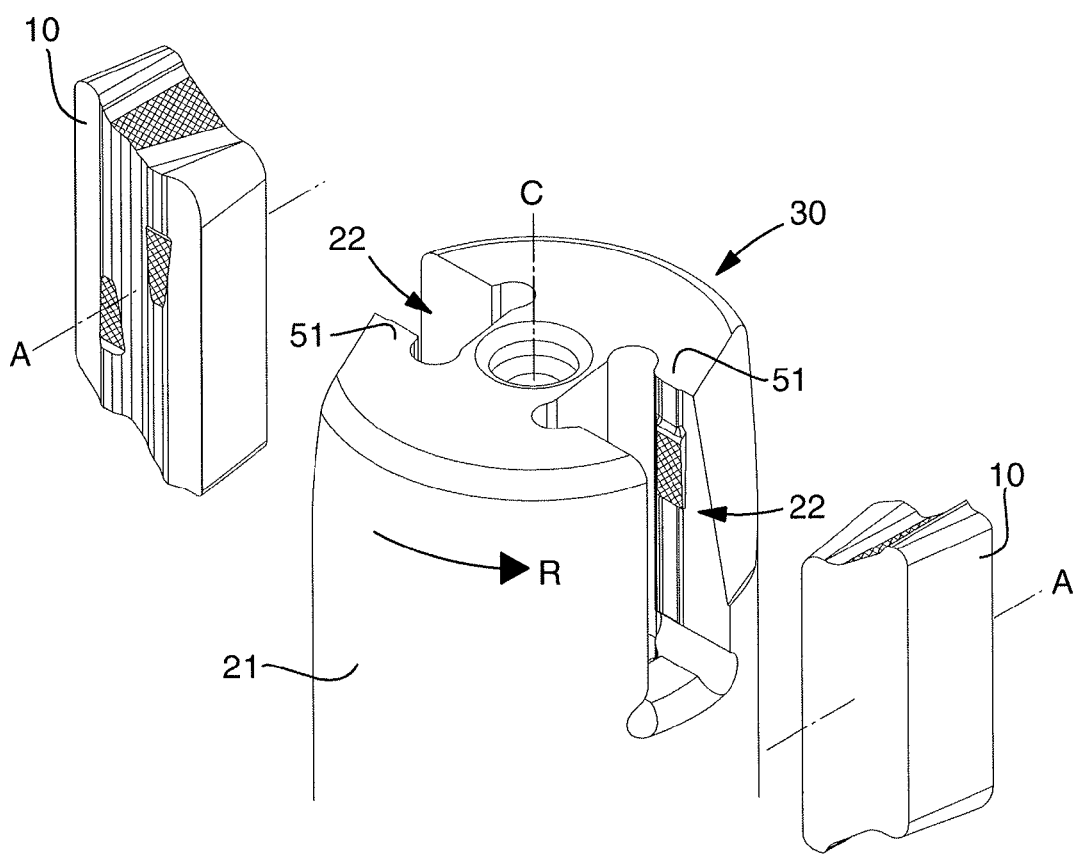

A design of the milling insert 10 according to an embodiment of the invention is shown in FIGS. 1a,b. The milling insert 10 includes a bottom surface 11 and an opposite chip surface 12 between which side surfaces extend. Two of the side surfaces are primary clearance surfaces 13 and two of the side surfaces are secondary clearance surfaces 14. The milling insert 10 has a plurality of cutting edges 15 formed between the chip surface 12 and the clearance surfaces 13, 14. Each one of the cutting edges 15 preferably includes a chip removing main cutting edge 16 and a surface-wiping minor cutting edge, e.g. a wiper edge adjacent to one of the corners. The main cutting edges 16 connect to the primary clearance surfaces 13 and are primarily parallel. However, the main cutting edges 16 do not necessarily need to be parallel in their entire length, but smaller deviations from the parallel design may occur. As seen from above, toward the chip surface 12, and as seen from below, toward the bottom surface 11, the milling insert 10 is essentially parallelogram-shaped. Usually, the milling insert 10 has two main cutting edges 16, but it may also have only one or more than two main cutting edges 16. In the figures, the main cutting edge 16 is illustrated as a straight cutting edge, but it may also have another design depending on which milling operation that is to be carried out. The cutting edge 15 may be formed in such a way that it suits the preferred milling operation. For instance, the main cutting edge 16 may have a concave or convex curvature, be waved and/or have a different height in relation to the bottom surface 11 at different parts of the cutting edge 16. The part of the main cutting edge 16 that is at the shortest distance from the wiper edge may for instance be positioned higher in relation to the bottom surface 11 than the part that is at farthest distance from the wiper edge, so that the cutting edge 16 has an inclination from one secondary clearance surface 14 to the other secondary clearance surface 14.

The design of the chip breakers and the clearance surfaces 13, 14 may be more or less complicated, depending on which milling operation that is to be carried out as well as which material that is to be removed. Since the design lacks importance to the invention, the chip breakers are illustrated in the figures as a simple concave surface and the clearance surfaces 13, 14 as plane surfaces. The clearance angle should, however, be positive along the entire cutting edge 15 in relation to the chip surface 12.

Between the chip surface 12 and bottom surface 11 of the milling insert 10, a center axis, A, extends, which perpendicularly intersects the chip surface 12 and the bottom surface 11 as well as runs through a center of the milling insert 10. In a preferred embodiment, the milling insert 10 has two main cutting edges 16 and has a rotation symmetry of 180° around the axis, A.

The milling insert 10 is advantageously manufactured from cemented carbide or another hard and wear-resistant material by usual pressing and subsequent sintering. The surface may be coated with one or more layers to further improve the performance of the milling insert 10. The choice of material may be adapted according to the intended field of application.

In order for the milling insert 10 according to an embodiment of the invention to be secured in the basic body and have a certain cutting position, it includes at least one lock structure, which includes a locking surface 17 and a coupling structure 18. A corresponding lock structure is found on the basic body. The lock structure of the milling insert 10 are shown in FIGS. 1a,b, and 2a-d. In order to facilitate the understanding of the embodiment, the milling insert 10, including the appurtenant lock structure, is schematically illustrated in FIGS. 2a-d.

The locking surface 17 is arranged on one of the secondary clearance surfaces 14, so that the locking surface 17 and the primary clearance surface 13 form an acute angle, α, in a section that is parallel to the bottom surface 11 and intersects the locking surface 17. The angle α is shown in FIG. 2b. The function of the locking surface 17 is to prevent movement in the radial direction during a milling operation. The locking surface 17 may be plane, rounded, i.e., concave or convex, or wave-shaped.

In order to get a sufficient securing effect, the angle, α, should be less than 90°, preferably less than 50°, more preferably 45° or less. A greater angle will not give the locking in the radial direction that is required for the milling insert 10 to be prevented from being pressed out of its cutting position during a milling operation. A greater angle will also entail that the cutting position becomes too indefinite, which may lead to inferior performance of the tool. Furthermore, the angle, α, should be greater than 10°, preferably greater than 30°, for the milling insert 10 to be easily mountable and for it not to have too small material thickness of the part including the locking surface 17. Too small a material thickness may result in the milling insert 10 getting inferior mechanical properties, and thereby in formations of cracks in the milling insert 10 more easily or in it even being broken off.

In order for the milling insert 10 according to an embodiment of the invention to be locked in both the radial and axial direction, the milling insert 10 also includes at least one coupling structure 18 that has the purpose of preventing the milling insert 10 from tipping as well as presses the locking surface 17 of the milling insert 10 against the corresponding locking surface 27 of the basic body. Thus, a coupling structure and a locking surface co-operate in pairs, so that they in the mounted state keep the milling insert 10 in place in the basic body. In the embodiment when the milling insert 10 has more than one lock structure and has a rotation symmetry of 180° around the axis, A, a lock structure, consisting of a coupling structure 18 and a locking surface 17, will accordingly always be active while at least one second lock structure is inactive. In order for the milling insert 10 to be indexable, the primary 13 and secondary 14 clearance surfaces should be identical. Hence, also the locking surfaces 17 have to be identical.

The coupling structure 18 is arranged on the chip surface 12 and projects at least partly from a plane that is parallel to the bottom surface 11 and passes through the points of the main cutting edges 16 situated closest to the bottom surface 11. In a preferred embodiment, the coupling structure 18 has the shape of a ridge having an inclination in relation to the plane parallel to the bottom surface 11 so that an apex of the ridge, which is at a shorter distance from the locking surface 17, is situated higher up, in relation to the bottom surface 11, than an apex situated at a further distance from the locking surface 17. Furthermore, the coupling structure 18 includes at least one flank surface 19, which is arranged in such a way that the flank surface 19, in a section that is parallel to the primary clearance surface 13 and intersects the flank surface 19, forms an acute angle, β, with the bottom surface 11 so that the flank surface 19 slopes in the direction from the secondary clearance surface 14 on which the locking surface 17 is arranged. The angle, β, is shown in FIG. 2c.

The angle, β, should be less than 30°, preferably less than 10°, more preferably less than 5°. Too large an angle, β, will result in the coupling structure 18 becoming too projecting from the chip surface 12 of the milling insert 10, and thereby the mounting of the milling insert 10 in the basic body will be made more difficult. Too small an angle will give a poor securing effect, and therefore the angle, β, should be greater than 1°, preferably greater than 2°.

In order to further increase the securing effect, the flank surface 19 of the coupling structure 18 of the milling insert 10, in a section parallel to a secondary clearance surface 14, should form an acute angle, γ, with the bottom surface 11 of the milling insert 10, which angle opens toward the primary clearance surface 13 most adjacent to the flank surface 19. The angle, γ, shown in FIG. 2d, should be less than 30°, preferably less than 10° in order for the mounting of the milling insert 10 in the basic body not to be obstructed. Furthermore, the angle, γ, should be greater than 1°, preferably greater than 2°, since too small an angle will give a poor securing effect.

The apex of the coupling structure 18 of the milling insert 10 has to be situated higher up in relation to the bottom surface 11 than the apex of the main cutting edge 16, at least in relation to the part of the main cutting edge 16 that is closest to the coupling structure 18. If the cutting edge is higher up than the coupling structure of the milling insert 10, it will impinge on the coupling structure 28 of the basic body in the mounting, which may lead to both the main cutting edge and the basic body being damaged.

FIG. 3 and FIGS. 4a-d show the basic body 30 according to the present embodiment. In order to facilitate the understanding of the embodiment, the basic body 30 is schematically illustrated in FIGS. 4a-d.

The basic body 30 according to the embodiment has a cylindrical basic shape with an envelope surface 21 and is rotatable around a center axis, C. Around the periphery, the basic body 30 is provided with a number of separated recesses 22 that are limited by a support surface 23 directed radially outward in the direction from the center axis C, a bottom support surface 24 directed in the intended direction of rotation, R, a side support surface 25 connecting to the bottom support surface 24 and the support surface 23, as well as a top support surface 26 opposite the bottom support surface 24. The chip space can have any design, but is in the figures only schematically illustrated and is delimited by a concavely arched surface. The basic body is usually manufactured from a softer material than the milling insert, for instance steel.

Each recess 22 includes at least one lock structure, which includes a locking surface 27 and a coupling structure 28. The lock structure of the basic body 30 should co-operate with the lock structure of the milling insert to keep the mounted milling insert in place during the milling operation. The locking surface 27 is arranged on the side support surface 25, so that the locking surface 27 and the side support surface 25, in a section that is parallel to the bottom support surface 24 and intersects the locking surface 27, form an acute angle, α', shown in FIG. 4c, representing the section IVc in FIG. 4b.

The coupling structure 28 of the basic body 30 is arranged on, and projecting from, the top support surface 26 and includes at least one flank surface 29, which is arranged in such a way that the flank surface 29, in a section that is parallel to the support surface 23 and intersects the flank surface 29, forms an acute angle, β', with the bottom support surface 24 so that the flank surface 29 slopes toward the side support surface 25. The angle β' is shown in FIG. 4b.

According to a preferred embodiment, a plane including the flank surface 29 in a section perpendicular to the center axis, C, forms an acute angle γ' with the bottom surface 24, which angle opens toward the support surface 23.

For the previously mentioned reasons, the angle α' should be less than 90°, preferably less than 50°, most preferably 45° or less but greater than 10°, preferably greater than 30°. The angles β' and γ' should each be less than 30°, preferably less than 10°, but greater than 1°, preferably greater than 2°.

Figure 8A:
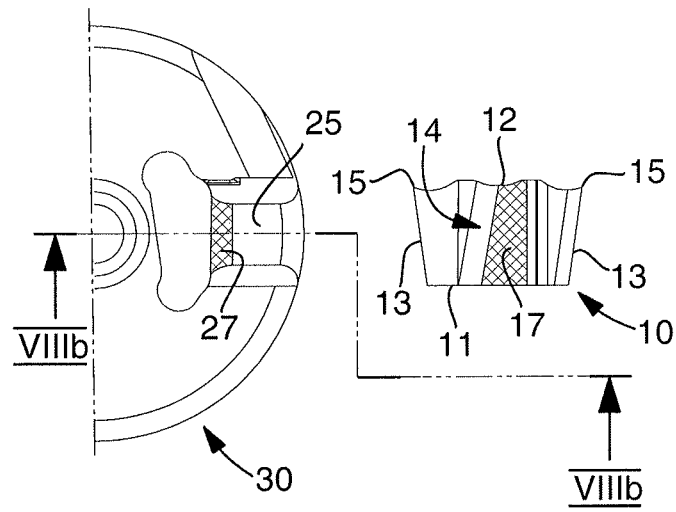
FIG. 8a shows an exploded planar view of the tool according to an embodiment of the invention, as seen in the axial direction.
Figure 8B:
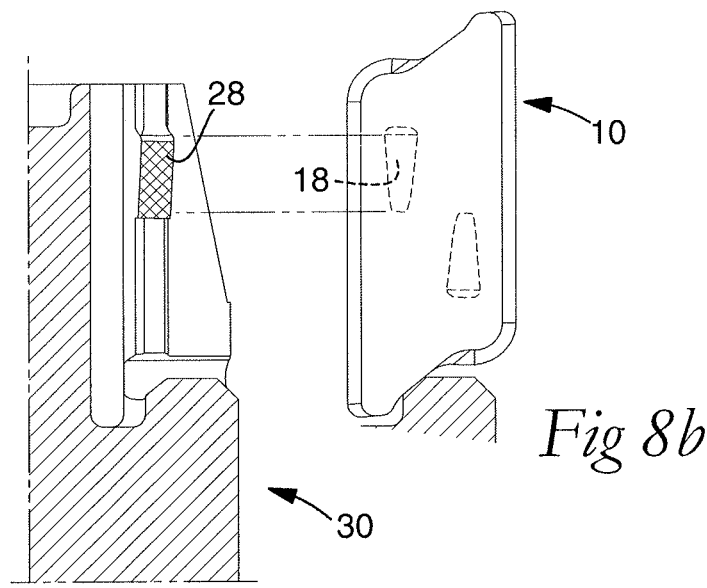
Figure 8C:
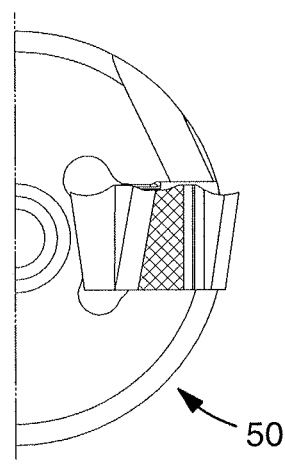
FIG. 8c shows a planar view of the tool according to the embodiment in FIG. 8a with the milling insert mounted, as seen in the axial direction.

The locking surfaces 17, 27 and the coupling structures 18, 28 of the milling insert and of the basic body, respectively, arranged at the angles α, α', β, β', γ, γ' described above, should together act to keep the milling insert in place in the basic body in a safe and well-defined way. FIGS. 6a-c, FIGS. 7a, b and FIGS. 8a-c show co-operation between the lock structure of the milling insert and of the basic body. FIGS. 6a-c show the angles β and β', and FIGS. 7a,b show the angles α and α'.

By forming the coupling structures 18, 28 according to the preferred embodiment, the milling insert and the basic body will be less sensitive to tolerances in the manufacture, thereby avoiding price rising grinding operations. Possible small deviations from the ideal geometrical design will not give any reduction of the securing effect, since such a deviation will be absorbed by the design of the coupling structures, specifically of the flank surfaces 19, 29.

Preferably, the coupling structure of the chip surface of the milling insert may have its principal extension parallel to a main cutting edge. This is for the securing force, in as an efficient way as possible, to be directed toward the side support surface 25 of the basic body and toward the support surface 23 of the basic body.

The coupling structures 18, 28 of the milling insert and of the basic body, respectively, may include one or two flank surfaces 19, 29. In order to obtain a fixed and distinct cutting position, at least one of the flank surfaces 19, 29 of the coupling structures may, according to an embodiment, be provided with a cambered surface, having a radius, q. By cambered, here reference is made to a surface that has a weak convex curvature, see FIGS. 9a,b. At least one flank surface may also be cambered in two or more directions. Such a flank surface will have two or more crossing ridges, so that the surface gets the shape of a dome.

According to a preferred embodiment, the coupling structure 28 may be placed at a shorter distance from the envelope surface 21 than from the center axis, C. The coupling structure 28 of the basic body will thereby be placed at a shorter distance from the envelope surface than from the support surface 23. The placement of the coupling structure of the milling insert follows from the placement of the coupling structure of the basic body, since the flank surfaces 19, 29 should co-operate in the mounted state. If the coupling structure is placed too close to the support surface 23 of the basic body, the milling insert will run a greater risk of tipping, during use. A placement closer to the envelope surface 21 gives an improved torque to counteract these turning forces that may get the milling insert to tip.

According to an additional preferred embodiment, the coupling structures are placed at a shorter distance from the upper side of the basic body, which upper side is shown in FIG. 4d, than from the side support surface 25. If the coupling structure is placed at too short a distance from the side support surface 25, the securing force that prevents the milling insert from tipping will become too weak.

Only the placement of the coupling structure 28 of the basic body is described above, but from that, the placement of the coupling structure 18 on the chip surface of the milling insert follows, since the two coupling structures should co-operate in the mounted state.

The present invention also includes a milling tool 50, see FIGS. 5a,b, which includes an essentially cylindrically shaped basic body 20 of the design described with reference to the FIGS. 3-4, and a number of corresponding milling inserts 10 described with reference to the FIGS. 1-2, which are detachably mounted to the basic body 20. In the mounting of a milling insert 10, the basic body 20 should yield elastically so that the milling insert 10 can be pressed into its position. The mounting takes place by means of an appropriate key that, when the milling insert 10 is being mounted in the basic body 20, primarily acts on the primary clearance surface 13 by a force in the radial direction toward the center axis, C. When the milling insert 10 is to be removed from the basic body 20, the force primarily acts on the secondary clearance surface 14 in the radial direction from the center axis, C. A recess may be arranged on the basic body 20 at the center axis, C, which recess may act supportingly to the key in the mounting and removal of milling inserts 10.

An advantage of the present invention is that the basic body by its design will provide the attachment of the milling insert 10 a further stability during a milling operation. The basic body has a wing 51, see FIGS. 5a,b, which abuts against the chip surface 12 of the milling insert 10. During a milling operation, the wing 51 will be pressed against the milling insert 10, so that the force is transferred via the milling insert 10 to the bottom support surface 24 of the basic body, so that the milling tool in practice will function as a solid milling cutter. This gives great advantages from a strength point of view and helps to keep the milling insert 10 in place.

FIGS. 6a-c, FIGS. 7a,b and FIGS. 8a-c show the co-operating surfaces when the milling insert is mounted in the basic body. FIGS. 6b,c shows the milling tool in a section VIb, where it is clearly seen how the coupling structures co-operate when the milling insert is mounted in the basic body. The angles β, β' and γ, γ' should be equally large or have very small mutual differences (<1°) in order for the flank surfaces 19, 29 to get sufficiently good contact. FIGS. 7a,b show how the locking surfaces 17, 27 of the milling insert and of the basic body, respectively, abut against each other. For the same reasons as described above for the flank surfaces of the coupling structures, the angles, α and α', of the locking surfaces should be equally large or have very small mutual differences (<5°).

In the alternative embodiment where at least one of the flank surfaces 19, 29 of the coupling structures is provided with a cambered surface, the parts of the flank surfaces that contact each other when the milling insert is mounted will be contact surfaces. Because of the cambered design thereof, the flank surfaces will not have contact in their entire extension. This means that the angles β, β' and γ, γ' primarily will be the angles that the flank surfaces have in the contact surfaces. For natural reasons, the contact surface of such an embodiment will have a smaller area than what would be the case if none of the flank surfaces were cambered.

Modifications of the placement and geometrical design of the lock structure should be considered to be included in the general idea of the invention. For instance, the coupling structure may consist of two or more separate components, wherein the different components afford a securing effect in different directions. However, the milling insert should always be locked in at least the axial and radial direction in the mounted state. Even if the invention has been exemplified by a milling tool, it may be applied to other tools for chip removing machining. The invention may also be attributed to tools of greater diameters than those given above.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. An indexable milling insert for milling tools, comprising:
    a bottom surface;
    an opposite chip surface;
    a plurality of side surfaces extending between the bottom surface and the opposite chip surface, two of the side surfaces being primary clearance surfaces and two of the side surfaces being secondary clearance surfaces;
    a plurality of cutting edges formed between the opposite chip surface and the primary and secondary clearance surfaces, wherein two cutting edges that connect to the primary clearance surfaces are primarily parallel and constitute main cutting edges;
    at least one lock structure comprising a locking surface arranged on one of the secondary clearance surfaces so that the locking surface and the primary clearance surface form an acute angle, $\alpha$, in a section that is parallel to the bottom surface and intersects the locking surface; and
    a coupling structure arranged on the opposite chip surface and at least partly projecting from a plane that is parallel to the bottom surface and passes through points of the main cutting edges situated closest to the bottom surface,
    wherein the coupling structure comprises at least one flank surface, which is arranged such that the flank surface, in a section that is parallel to the primary clearance surface and intersects the flank surface, forms an acute angle $\beta$ with the bottom surface so that the flank surface slopes in a direction from the secondary clearance surface on which the locking surface is arranged.

2. The milling insert according to claim 1, wherein the angle $\alpha$ is less than 90° and greater than 10°.

3. The milling insert according to claim 1, wherein the angle $\alpha$ is less than 50° and greater than 30°.

4. The milling insert according to claim 1, wherein the angle $\alpha$ is less than or equal to 45° and greater than 10°.

5. The milling insert according to claim 1, wherein the angle $\alpha$ is less than or equal to 45° and greater than 30°.

6. The milling insert according to claim 1, wherein the coupling structure has a principal extension parallel to a main cutting edge.

7. The milling insert according to claim 1, wherein the angle $\beta$ is less than 30° and greater than 1°.

8. The milling insert according to claim 1, wherein the angle $\beta$ is less than 10° and greater than 2°.

9. The milling insert according to claim 1, wherein the angle $\beta$ is less than 5° and greater than 2°.

10. The milling insert according to claim 1, wherein two lock structures are rotationally symmetrical placed at 180° in relation to a center axis A which comprises a center of the opposite chip surface and a center of the bottom surface.

11. The milling insert according to claim 1, wherein the flank surface, in a section parallel to a secondary clearance surface, forms an acute angle $\gamma$ with the bottom surface, the angle $\gamma$ opening toward the primary clearance surface most adjacent to the flank surface.

12. The milling insert according to claim 11, wherein the angle $\gamma$ is less than 30° and greater than 1°.

13. The milling insert according to claim 11, wherein the angle $\gamma$ is less than 10° and greater than 2°.

14. The milling insert according to claim 11, wherein the angle $\gamma$ is less than 5° and greater than 2°.

15. The milling insert according to claim 1, wherein the coupling structure comprises two flank surfaces.

16. The milling insert according to claim 1, wherein the flank surface of the coupling structure has a cambered surface.

17. The milling insert according to claim 16, wherein the flank surface of the coupling structure is cambered in two directions.

18. A basic body for milling tools, comprising:
    an envelope surface having a cylindrical basic shape and being rotatable around a center axis C;
    at least one support surface directed radially outward in a direction from the center axis, C;
    at least one bottom support surface directed in a direction of rotation;
    at least one top support surface opposite the bottom support surface;
    at least one side support surface connecting to the bottom support surface and the support surface, wherein the support surface, the bottom support surface, and the side support surface define a plurality of separated recesses provided around a periphery of the envelope surface;
    at least one lock structure provided in each recess, wherein the lock structure comprises a locking surface and a coupling structure, the locking surface being arranged on the side support surface, so that the locking surface and the support surface, in a section that is parallel to the bottom support surface and intersects the locking surface, form an acute angle $\alpha'$; and
    the coupling structure arranged on, and projecting from, the top support surface and comprises at least one flank surface, which is arranged such that the flank surface, in a section that is parallel to the support surface and intersects the flank surface, forms an acute angle $\beta'$ with the bottom surface so that the flank surface slopes toward the side support surface.

19. The basic body according to claim 18, wherein the angle $\alpha'$ is less than 90° and greater than 10°.

20. The basic body according to claim 18, wherein the angle $\alpha'$ is less than 50° and greater than 30°.

21. The basic body according to claim 18, wherein a plane comprising the flank surface in a section perpendicular to the center axis C forms an acute angle $\gamma'$ with the bottom surface, which angle opens toward the support surface.

22. The basic body according to claim 21, wherein the angle $\gamma'$ is less than 30° and greater than 1°.

23. The basic body according to claim 21, wherein the angle $\gamma'$ is less than 10° and greater than 2°.

24. The basic body according to claim 21, wherein the angle $\gamma'$ is less than 5° and greater than 2°.

25. The basic body according to claim 18, wherein the coupling structure comprises two flank surfaces.

26. The basic body according to claim 18, wherein the flank surface of the coupling structure has a cambered surface.

27. The basic body according to claim 26, wherein the flank surface of the coupling structure is cambered in two directions.

28. A milling tool, comprising:
    a basic body having a cylindrical basic shape and being rotatable around a center axis C;
    at least one support surface of the basic body directed radially outward in a direction from the center axis C;
    at least one bottom support surface of the basic body directed in a direction of rotation;
    at least one top support surface of the basic body opposite the bottom support surface;
    at least one side support surface of the basic body connecting to the bottom support surface and the support surface, wherein the support surface, the bottom support surface, and the side support surface define a number of separated recesses around a periphery of the basic body;

at least one indexable milling insert comprising
a bottom surface,
an opposite chip surface,
a plurality of side surfaces extending between the bottom surface and the opposite chip surface, two of the side surfaces being primary clearance surfaces and two of the side surfaces being secondary clearance surfaces, and
a plurality of cutting edges formed between the opposite chip surface and the clearance surfaces, where two cutting edges that connect to the primary clearance surfaces are primarily parallel and constitute main cutting edges; and the basic body further comprising a first lock structure and the milling insert comprising at least one corresponding second lock structure, the first and second lock structures comprising respective locking surfaces each one of which forms an acute angle $\alpha$, $\alpha'$ with the support surface of the basic body in a section that is parallel to the bottom support surface of the basic body and intersects the respective locking surface, and the first and second lock structures further comprising respective coupling structures arranged on the top support surface of the basic body and the opposite chip surface of the milling insert, respectively, each one of the first and second lock structures comprising at least one flank surface arranged such that the flank surface, in a section that is parallel to the support surface and intersects the flank surface, forms an acute angle $\beta$, $\beta'$ with the bottom surface, so that the flank surfaces slope toward the side support surface of the basic body, and that the first and second lock structures simultaneously press the milling insert toward the side support surface of the basic body, and toward the support surface of the basic body, so that the milling insert is kept in place in the basic body.

29. The milling tool according to claim 28, wherein the milling tool is a shank-end mill.

* * * * *